United States Patent [19]
Shi et al.

[11] Patent Number: 5,689,268
[45] Date of Patent: Nov. 18, 1997

[54] RADAR DETECTION AND CLASSIFICATION OF HELICOPTERS

[75] Inventors: Nai K. Shi, Huntington Beach; Henry F. Williams, Temecula, both of Calif.

[73] Assignee: Boeing North American, Inc., Seal Beach, Calif.

[21] Appl. No.: 691,729

[22] Filed: Aug. 2, 1996

[51] Int. Cl.$^6$ .................................................. G01S 13/52
[52] U.S. Cl. ........................................ 342/196; 342/192
[58] Field of Search .............................. 342/196, 195, 342/192, 160, 90, 28, 27

[56] References Cited

U.S. PATENT DOCUMENTS

| | | | |
|---|---|---|---|
| 4,275,396 | 6/1981 | Jacomini | 342/192 |
| 4,346,382 | 8/1982 | Bosc et al. | 342/192 |
| 4,389,647 | 6/1983 | Fanuele et al. | 342/192 |
| 5,055,848 | 10/1991 | Rotgans | 342/90 |
| 5,070,335 | 12/1991 | Lewis et al. | 342/192 |
| 5,081,459 | 1/1992 | Guillerot et al. | 342/192 |
| 5,231,402 | 7/1993 | Ludloff et al. | 342/192 |
| 5,347,282 | 9/1994 | La Grange et al. | 342/196 |
| 5,376,940 | 12/1994 | Abatzoglou | 342/192 |

*Primary Examiner*—Daniel T. Pihulic
*Attorney, Agent, or Firm*—Charles T. Silberberg; Tom Streeter

[57] ABSTRACT

The blade flash signature in a radar return is enhanced and used to detect and classify helicopter targets. The radar return of a target is fast Fourier transformed 34, and the frequencies corresponding to DC and the body of the target are filtered out 38. The filtered signal is inverse transformed 44, moving averaged 52, and auto-correlated 54. Auto-correlation 54 may take place in the frequency domain. If there are significant peaks in the auto-correlation output (other than at zero time delay), then a helicopter is present. The time delay between peaks is the period of the blade. The height of the peak indicates whether it is the main blade or the tail blade which has been detected, and allows a signal indicating both periods to be output. The main blade period and the ratio of the period to that of the tail blade can be compared with a data base to classify the helicopter.

16 Claims, 5 Drawing Sheets

RADAR DETECTION AND CLASSIFICATION OF HELICOPTERS

BACKGROUND OF THE INVENTION

A hovering or slowly flying helicopter has a radar return made up of two parts. One constantly changes with each new position of the rotor blade, and a second does not. This makes it difficult to distinguish the helicopter's radar return both from that of background clutter and from that of ground military vehicles. Even when it is clear that some sort of target is standing out from the background clutter, it is difficult for a military commander to identify it. The prior art has considered the radar return of an enemy attack helicopter which is hovering slightly off the ground to be not easily distinguished from the radar return of, for example, an enemy armored personnel carrier (APC), or a decoy. The helicopter is usually the greater threat, and is always a different threat. The ability to detect and classify a helicopter would greatly enhance the commander's battlefield control.

SUMMARY OF THE INVENTION

The present invention provides this ability by enhancing the very facet of the radar return which has so dogged the prior art: its changeability. This facet is the helicopter main and tail blade flashes, which are usually very strong and impulsive. The radar return is Fourier transformed (preferably with an FFT), and the frequencies corresponding to DC and the body of the helicopter (but not the hub supporting the main blade), are filtered out. The filtered signal is inverse transformed, moving averaged, and auto-correlated. Auto-correlation may take place in the frequency domain. If there are significant peaks in the auto-correlation output (other than at zero time delay), then a helicopter is present. The time delay between peaks is the period of the blade. The height of the peak indicates whether it is the main blade or the tail blade which has been detected, and allows a signal indicating both periods to be output. This output signal and the main-to-tail ratio of the blade periods can be compared with a data base to classify the helicopter.

DETAILED DESCRIPTION OF THE DRAWINGS

Physics of Helicopters

Figure 1A:
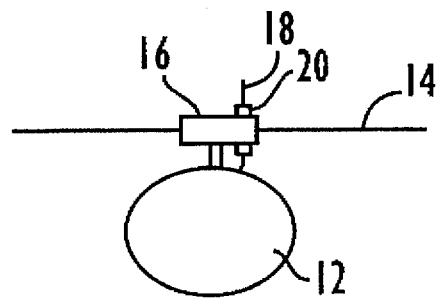
FIG. 1 shows the geometry of a helicopter, from the front (FIG. 1A) and the side (FIG. 1B).
Figure 1B:
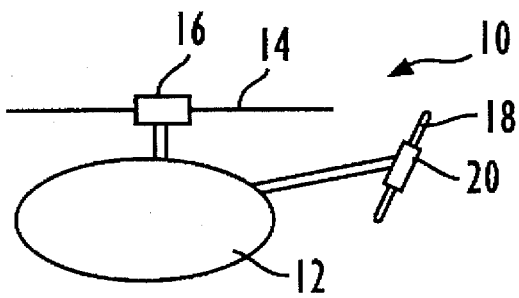

FIG. 1 shows an Apache attack helicopter 10. It has a body 12, a main blade 14 on a main hub 16, and a tail blade 18 on a tail hub 20. It can be seen that the main and tail rotors will produce returns at not only a single frequency, but a variety of frequencies depending on the distance of the scatterers from the center of rotation. In each rotor there are two types of scatterers, those in the blades 14, 18 and those in the hubs 16, 20, the hubs 16, 20 being the complex inner structures that hold the blades to the spindle.

Figure 2:
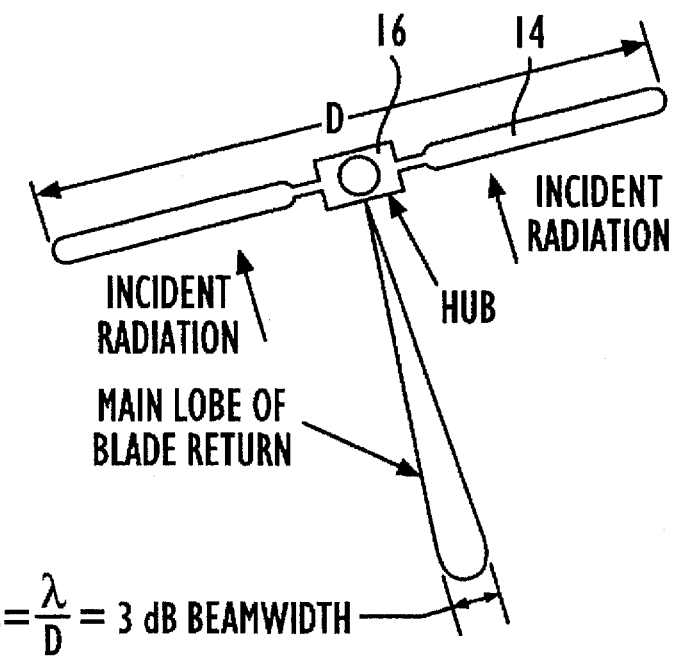
FIG. 2 shows the geometry of the main rotor blade and the concentration of radar return energy in the broadside direction.

FIG. 2 shows more detail of the main blade and hub. Assuming the scatterers are uniformly distributed, they will sum together in phase when the radar is at right angles to the blade 14. For a blade length D, the 3 dB beamwidth is approximately $\lambda/D$. For a helicopter, D is about 14.6 m. At 95 GHz, $\lambda=0.0032$ m. This gives a 3 dB beamwidth of about 0.2 mr or a blade flash (for a nominal 10 rps blade rate) of $0.0002/62.8=3$ μsec. Since the hub diameter is only about 2 m, the flash due to the hub should last about 21 μsec. Therefore, to see the hub reliably, the radar pulse repetition interval should be less than 21 μsec. Likewise, to see the blade reliably, the radar pulse repetition interval should be less than 3 μsec. The velocity spectrum due to the hub should be ±62.8 m/sec about the main body line depending on the distance of each scatterer from the axis of rotation whereas that due to the main rotor blade 14 should be ±400 m/sec.

The relative size of scatterers in the hub 16 is considerably above that in the blade 14 because of the angular nature of the hub structure and its materials (being mostly metal) compared to those in the blade 14 with its low frontal area and largely dielectric composition.

It is this periodic hub 16 and blade 14 flash that separates helicopters 10 from other maneuverable vehicles and provides a strong discriminant for classification. The blade 14 flash rate itself provides an identification discriminant since it is known that the tip velocity must be between certain limits for structural and aerodynamic stability. Therefore only certain helicopters 10 with the appropriate numbers of blades 14 and blade diameters can support a given blade flash rate.

The tail rotor 18 also causes a blade flash effect if not hidden by clutter, or by the fuselage 12, or if the helicopter is not broadside. The tail rotor 18 typically rims at between 50 and 110 rps. Typical tail rotors 18 have diameters of about 3 m or ⅕ of the main rotor 14. Therefore again, for stability, it is necessary that there be a distinct relationship between allowable rotor speeds or periods of the main and tail rotors. The ratio of the main flash period to that of the tail can be used classify different types of helicopters.

Figure 3:
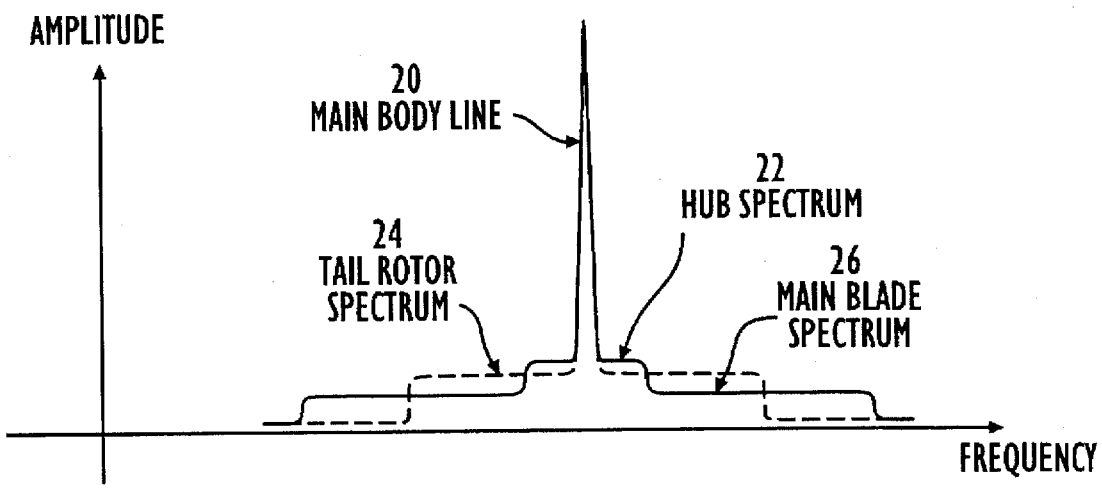
FIG. 3 is an idealized frequency spectrum of a helicopter radar return.
Figure 4:
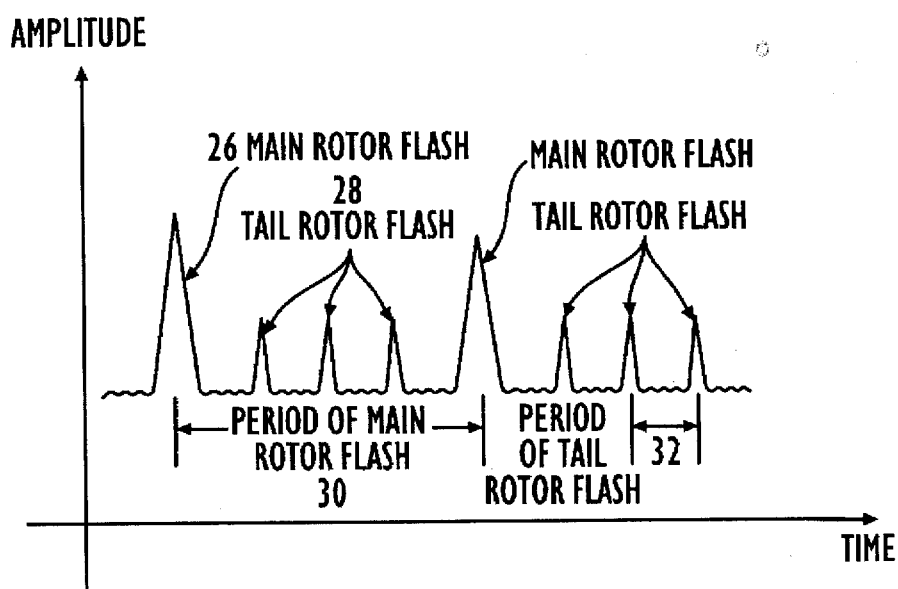
FIG. 4 is the time series resulting from the spectrum of FIG. 3 after filtration and inverse transformation.

A typical helicopter frequency spectrum at blade flash is shown in FIG. 3. In this figure, notice that the main body line amplitude 20 greatly surpasses the hub spectrum 22 amplitude which in turn greatly surpasses the tail rotor 24 and main blade 26 spectrum amplitude. Note that the main body line 20 stays approximately constant during both types of blade flash. FIG. 3 also shows that in order to see the main blade flash or tail rotor flash reliably, the main body line 20 with its overwhelming energy must be removed. If it is removed in the frequency domain by a short term transform, the residual energy in the time domain would represent both main and tail rotor flashes. This is depicted in FIG. 4 where a time series with flashes for both main 28 and tail 30 rotors is depicted.

These considerations show that it is possible to achieve both helicopter classification and identification by examination of blade flash amplitudes and periods 30, 32 in the time domain. The condensation of energy in the time domain at the blade flashes enables a relatively high level of discrimination. A good discussion of classification of targets in general, and helicopters in particular, can be found in Currie, N. C. and C. E. Brown, 1987, *Principles and Applications of Millimeter-Wave Radar*, Artech House, Norwood, Mass., the disclosure of which is incorporated by reference.

Processing Approach

Following the above physical reasoning, our processing approach is first to remove the energy corresponding to the main body line and then to look at the periods remaining in the data by examination of the time auto-correlation function. Short spectral transforms and the auto-correlation are done over the residual integrated energy for each transform interval.

Signal Processing

Figure 5:
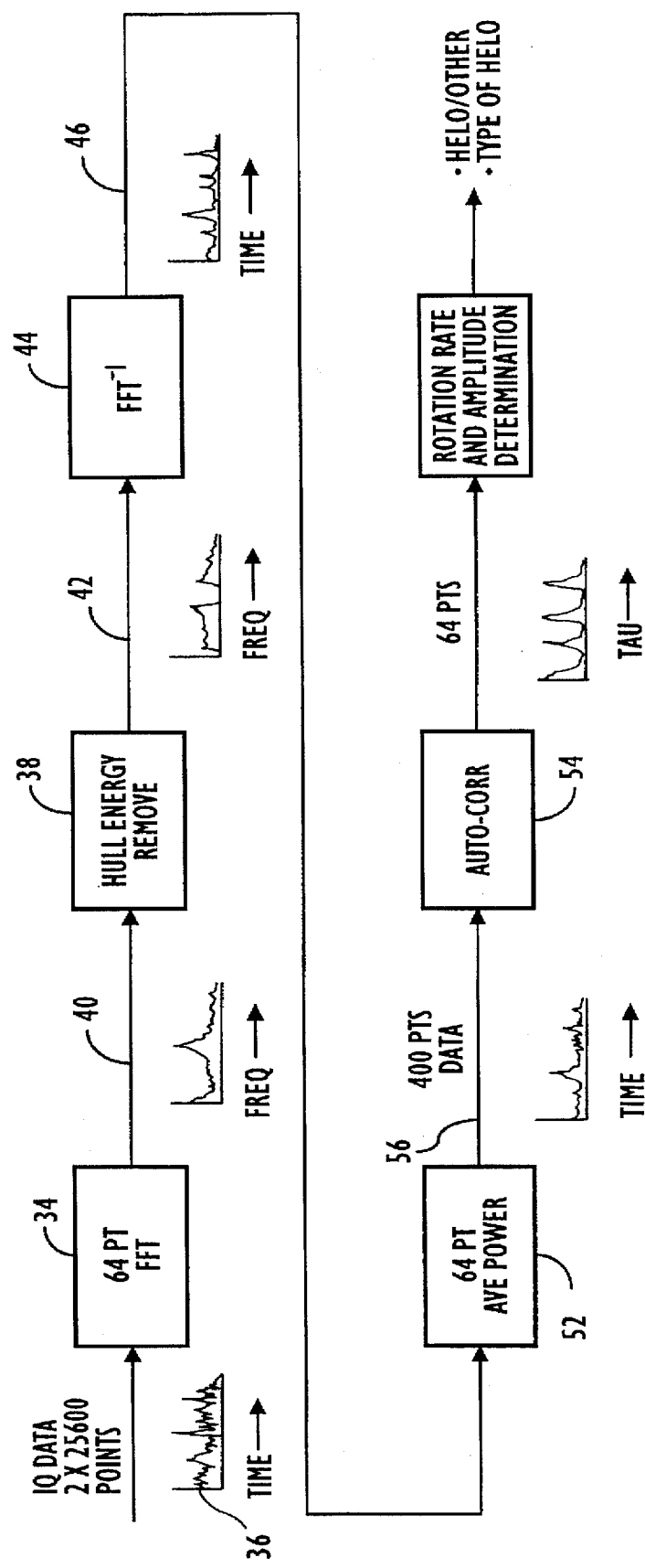
FIG. 5 is a functional flow diagram of the present invention.

A functional flow diagram for the signal processing algorithm is given in FIG. 5. In essence, the aim of the algorithm is to determine the blade flash rate of a helicopter target by measuring the time interval between the blade flash in the time series. The next several paragraphs discuss several signal-to-noise ratio (SNR) improvement techniques used to improve the accuracy of the flash period measurements.

A major portion of the main-body hull energy is removed by taking piece-wise Fourier Transforms (FT), preferably a Fast Fourier Transform (FFT) 34, of the complex IQ (I=in-phase; Q=quadrature-phase) time series 36, then zeroing 38 the frequencies 40 near the main body peak and the DC bins. The resulting spectra 42 are inverse transformed 44 back to the time domain and assembled in correct order. Samples at the beginning and end of the time sections 46 are removed to minimize the processing effects of the transform.

Figure 6:
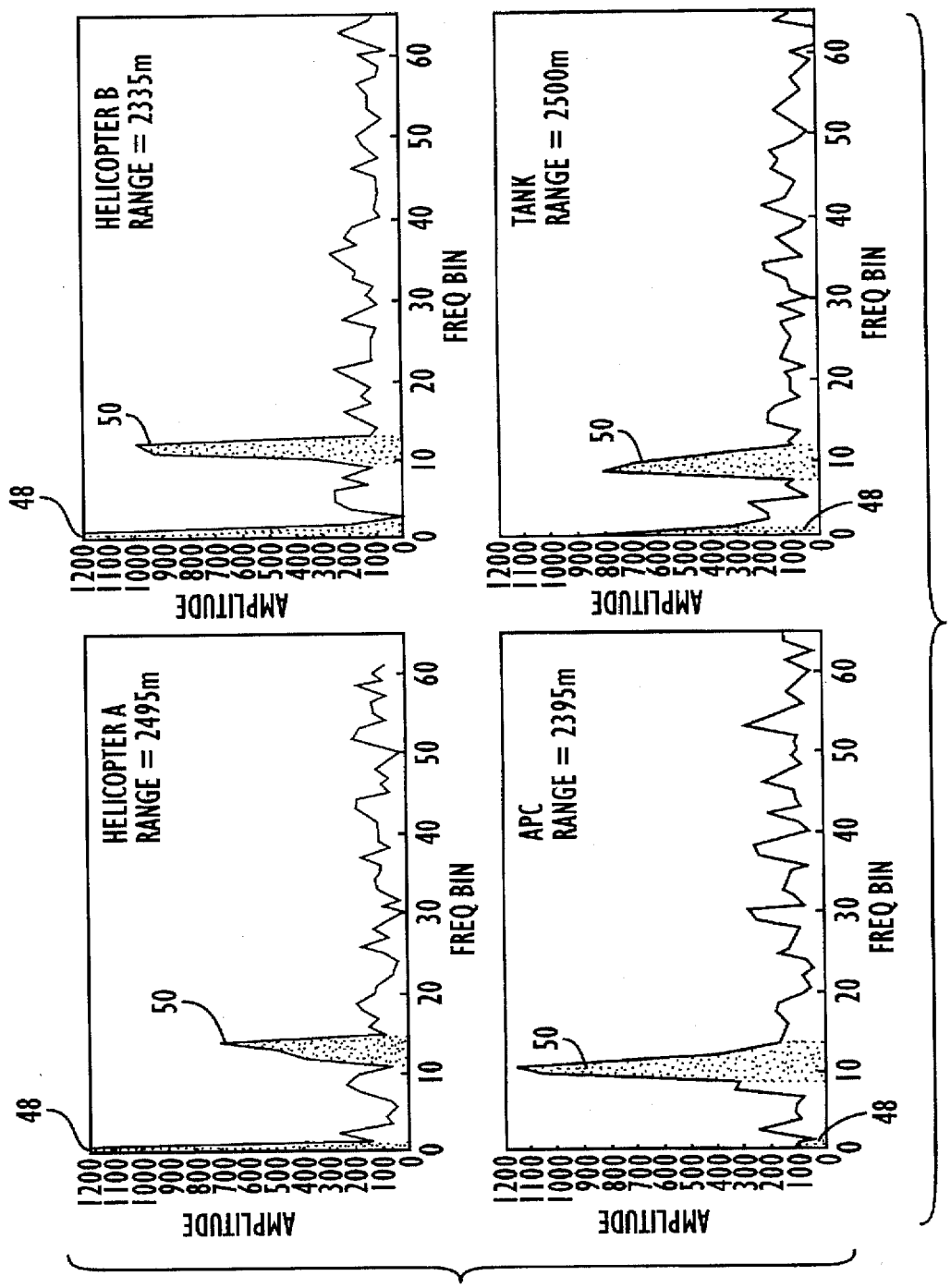
FIG. 6 shows typical frequency spectra for various moving targets.

A few target spectral plots are given in FIG. 6 showing the dominant main body peaks caused by the Doppler effect of the target in motion. The energy at the DC bins 48 are due to the stationary components of the background and the targets. The blade flashes, being impulsive-like in time domain, will have energy spread throughout most of the frequency spectrum. In the figure, the shaded regions 50 are the spectral bins removed to enhance the blade flashes.

The SNR can be further improved (FIG. 5) by averaging 52 the time series. The idea is to select an averaging window size small enough to contain most of the individual flash energy and yet large enough to smooth out the random background noise. An additional advantage of the averaging process is the effective reduction of the sampling rate with the corresponding decrease in the computational load. In our processing, a 64 point averaging of the 20 KHz samples appears near optimal and has been used throughout.

It is relatively easy to discriminate helicopters from other targets such as tanks, APC, etc., by the presence of blade flash lines in the time series with their obvious periodicity. The periodicity of the flashes can be further enhanced by taking an auto-correlation function 54 of the time series 56. To reduce the computational load of the auto-correlation function 54, it is done in the frequency domain where the multiplication of the spectra can be done more efficiently than the convolution process in the time domain. To have sharper auto-correlation peaks, a fraction of the time series bias is removed before the auto-correlation computation.

Figure 7:
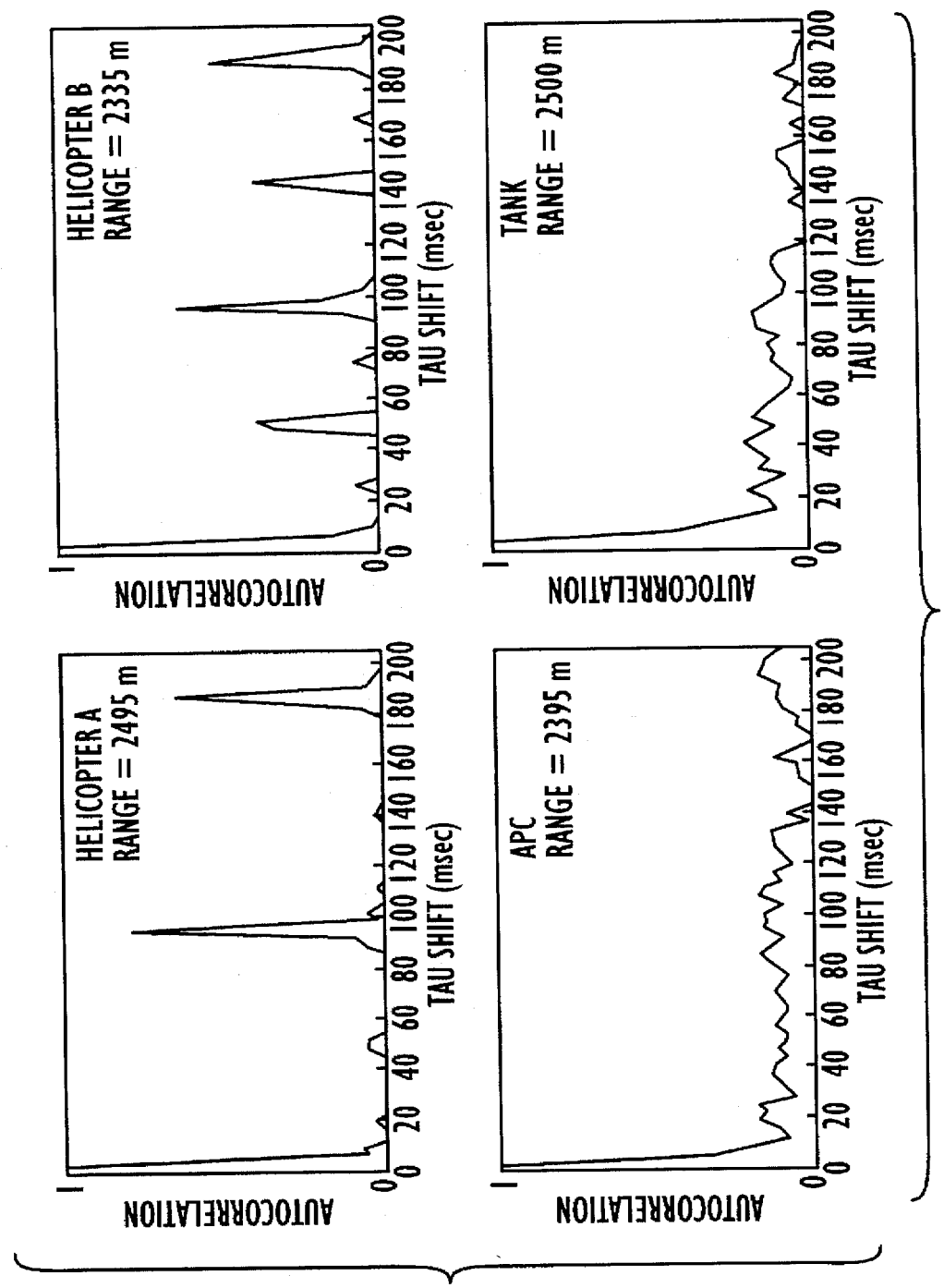
FIG. 7 shows the auto-correlation functions of the targets of FIG. 6.

FIG. 7 shows examples of auto-correlation functions corresponding to the time series of FIG. 6. The auto-correlation function for the helicopters are very distinct from the smooth curves of the ground targets, and, as can be seen in FIG. 7, there is no difficulty in the classification of the helicopters (i.e., discrimination from ground vehicles) at a range of about 2.5 km.

SCOPE OF THE INVENTION

While an embodiment of the invention has been described in some detail, the true scope and spirit of the invention is not limited thereto, but is limited only by the appended claims, and their equivalents.

What is claimed is:

1. A method for detecting a helicopter, the method comprising the steps of:
   (a) sensing a radar return from a target;
   (b) digitizing the radar return to produce a time series;
   (c) taking a plurality of piece-wise Fourier transforms of the time series to produce a like plurality of frequency spectra;
   (d) within each frequency spectrum, setting to zero the frequencies near a DC bin and a main body peak bin to produce a zeroed spectrum;
   (e) inverse transforming the zeroed spectra to form a plurality of time sections;
   (f) removing end samples from each time section to produce a filtered time section;
   (g) assembling the filtered time sections to produce a filtered time series;
   (h) taking a moving average of the filtered time series to produce an averaged time series;
   (i) auto-correlating the averaged time series to produce an auto-correlated time series; and
   (k) outputting a "helicopter detected" signal if the auto-correlated time series shows significant non-zero-time-delay peaks.

2. A method for classifying a helicopter, the method comprising the steps of:
   (a) detecting the helicopter according to the method of claim 1;
   (b) comparing a time delay interval between auto-correlated time series peaks with a data base of helicopter classes and their respective blade flash periods; and
   (c) selecting the helicopter class having a blade flash period which most closely correlates with the time delay interval between auto-correlated time series peaks.

3. The method according to claim 2, wherein the time delay interval between auto-correlated time series peaks is a single component number representing the period of the helicopter's main blade.

4. The method according to claim 2, wherein the time delay interval between auto-correlated time series peaks is a double component number, the first component representing the period of the helicopter's main blade, and the second component representing the period of the helicopter's tail blade.

5. The method of claim 1, further comprising the steps of:
   (a) transforming to frequency domain before the auto-correlation step; and
   (b) transforming back to time domain after the auto-correlation step.

6. A method for classifying a helicopter, the method comprising the steps of:
   (a) detecting the helicopter according to the method of claim 5;
   (b) comparing a time delay interval between auto-correlated time series peaks with a data base of helicopter classes and their respective blade flash periods; and
   (c) selecting the helicopter class having a blade flash period which most closely correlates with the time delay interval between auto-correlated time series peaks.

7. The method according to claim 6, wherein the time delay interval between auto-correlated time series peaks is a single component number representing the period of the helicopter's main blade.

8. The method according to claim 6, wherein the time delay interval between auto-correlated time series peaks is a double component number, the first component representing the period of the helicopter's main blade, and the second component representing the period of the helicopter's tail blade.

9. The method of claim 1, wherein the Fourier transforms are fast Fourier transforms.

10. The method of claim 2, wherein the Fourier transforms are fast Fourier transforms.

11. The method of claim 3, wherein the Fourier transforms are fast Fourier transforms.

12. The method of claim 4, wherein the Fourier transforms are fast Fourier transforms.

13. The method of claim 5, wherein the Fourier transforms are fast Fourier transforms.

14. The method of claim 6, wherein the Fourier transforms are fast Fourier transforms.

15. The method of claim 7, wherein the Fourier transforms are fast Fourier transforms.

16. The method of claim 8, wherein the Fourier transforms are fast Fourier transforms.

* * * * *